(12) United States Patent
Tecza et al.

(10) Patent No.: US 8,651,747 B2
(45) Date of Patent: Feb. 18, 2014

(54) PLANETARY-TYPE AUXILIARY BEARING

(75) Inventors: Joseph A. Tecza, Scio, NY (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/642,767

(22) PCT Filed: Jul. 29, 2011

(86) PCT No.: PCT/US2011/045987
§ 371 (c)(1),
(2), (4) Date: Dec. 17, 2012

(87) PCT Pub. No.: WO2012/057890
PCT Pub. Date: May 3, 2012

(65) Prior Publication Data
US 2013/0209018 A1    Aug. 15, 2013

Related U.S. Application Data

(60) Provisional application No. 61/407,550, filed on Oct. 28, 2010.

(51) Int. Cl.
*F16C 19/50*   (2006.01)

(52) U.S. Cl.
USPC .................................................. 384/549

(58) Field of Classification Search
USPC ............................................... 384/549
See application file for complete search history.

(56) References Cited

U.S. PATENT DOCUMENTS

| | | | | |
|---|---|---|---|---|
| 2,926,974 A | * | 3/1960 | Anderson et al. | 384/549 |
| 3,836,103 A | * | 9/1974 | Retali et al. | 384/549 |
| 4,160,569 A | * | 7/1979 | Reid | 384/549 |
| 4,605,320 A | * | 8/1986 | Gossner | 384/494 |
| 5,021,697 A | | 6/1991 | Kralick | |
| 5,044,786 A | * | 9/1991 | Jacob et al. | 384/549 |
| 5,272,403 A | | 12/1993 | New | |
| 5,345,127 A | | 9/1994 | New | |

FOREIGN PATENT DOCUMENTS

JP    2002-218708 A    8/2002

OTHER PUBLICATIONS

International Application No. PCT/US2011/0445987—Notification of International Search Report and Written Opinion mailed Mar. 21, 2012.

* cited by examiner

*Primary Examiner* — Thomas R Hannon
(74) *Attorney, Agent, or Firm* — Edmonds & Nolte, PC

(57) ABSTRACT

An auxiliary bearing including a support structure extending at least partially around a circumference of a shaft. A first pedestal may extend in a radially-inward direction from the support structure. First and second beams may extend from opposite sides of the first pedestal in a plane perpendicular to an axis of the shaft. First and second rollers may be operatively coupled to the first and second beams, and the first and second rollers may be configured to engage the shaft.

20 Claims, 6 Drawing Sheets

PLANETARY-TYPE AUXILIARY BEARING

CROSS-REFERENCE TO RELATED APPLICATIONS

This application is a U.S.national stage application of PCT Patent Application PCT/US2011/045987, filed Jul. 29, 2011, which claims priority to U.S. Provisional Patent Application Ser. No. 61/407,550, which was filed Oct. 28, 2010. These priority applications are hereby incorporated by reference in their entirety into the present application.

BACKGROUND

A shaft supported by magnetic bearings requires a set of auxiliary bearings, also known as "coast down bearings" or "catcher bearings," to support the shaft when the shaft drops. When the shaft drops onto the auxiliary bearings, the auxiliary bearings support the shaft in a stable position for continued operation or coast down.

Most auxiliary bearing systems utilize co-axially mounted rolling element bearings through which the shaft extends. A clearance exists between an inner race of the rolling element bearings and the shaft. When the magnetic bearings cannot support the shaft, the shaft drops onto the inner race of the rolling element bearing, and the inner race, which is stationary or slow rolling when the shaft drops, spins up and begins to rotate with the shaft until both the shaft and the inner race come to the same speed. This spin up process subjects the rolling element bearings to extreme acceleration and wear which causes damage to the bearing elements, thus limiting the lifespan of the rolling element bearing to a handful of shaft drops.

Other auxiliary bearings generally include a plurality of rollers mounted radially outward from the shaft. The rollers include rolling element bearings disposed therein to support the rollers and allow them to spin freely. When the shaft drops onto the rollers, the rollers engage and rotate with the shaft until both the shaft and the rollers come to the same speed. Conventional auxiliary bearings, however, include complex support structures, and have limited capability to custom tailor damping and stiffness of the bearing supports.

There is a need, therefore, for an improved auxiliary bearing system adapted to support a shaft when an active magnetic bearing fails, or is otherwise shut down, and the shaft drops without the disadvantages noted above.

SUMMARY OF THE INVENTION

Embodiments of the disclosure may provide an auxiliary bearing including a support structure extending at least partially around a circumference of a shaft. A first pedestal may extend radially-inward from the support structure. First and second beams may extend from opposite sides of the first pedestal in a plane perpendicular to an axis of the shaft. First and second rollers may be operatively coupled to the first and second beams, and the first and second rollers may be configured to engage the shaft.

Embodiments of the disclosure may further provide an auxiliary bearing including a support structure extending at least partially around a circumference of a shaft. First and second pedestals may extend radially-inward from the support structure, and the second pedestal may be axially-offset from the first pedestal with respect to the shaft. First and second flexible beams may extend from opposite sides of the first pedestal in a plane perpendicular to an axis of the shaft. Third and fourth flexible beams may extend from opposite sides of the second pedestal in a plane perpendicular to the axis of the shaft, and the third beam may be axially-symmetric with the first beam, and the fourth beam may be axially-symmetric with the second beam. A first roller may be disposed between the first and third beams and adapted to engage the shaft, and a second roller may be disposed between the second and fourth beams and adapted to engage the shaft.

Embodiments of the disclosure may further provide a method for supporting a rotating shaft with an auxiliary bearing when a primary bearing system is unable to support the shaft. The method may include engaging the shaft with a first roller disposed at a first circumferential location. The first roller may be operatively coupled to and supported by a first beam extending from a first side of a pedestal in a plane perpendicular to an axis of the shaft. The method may further include engaging the shaft with a second roller disposed at a second circumferential location. The second roller may be operatively coupled to and supported by a second beam extending from a second side of the pedestal in a plane perpendicular to the axis of the shaft. The method may also include rotating the first and second rollers in response to the rotation of the shaft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
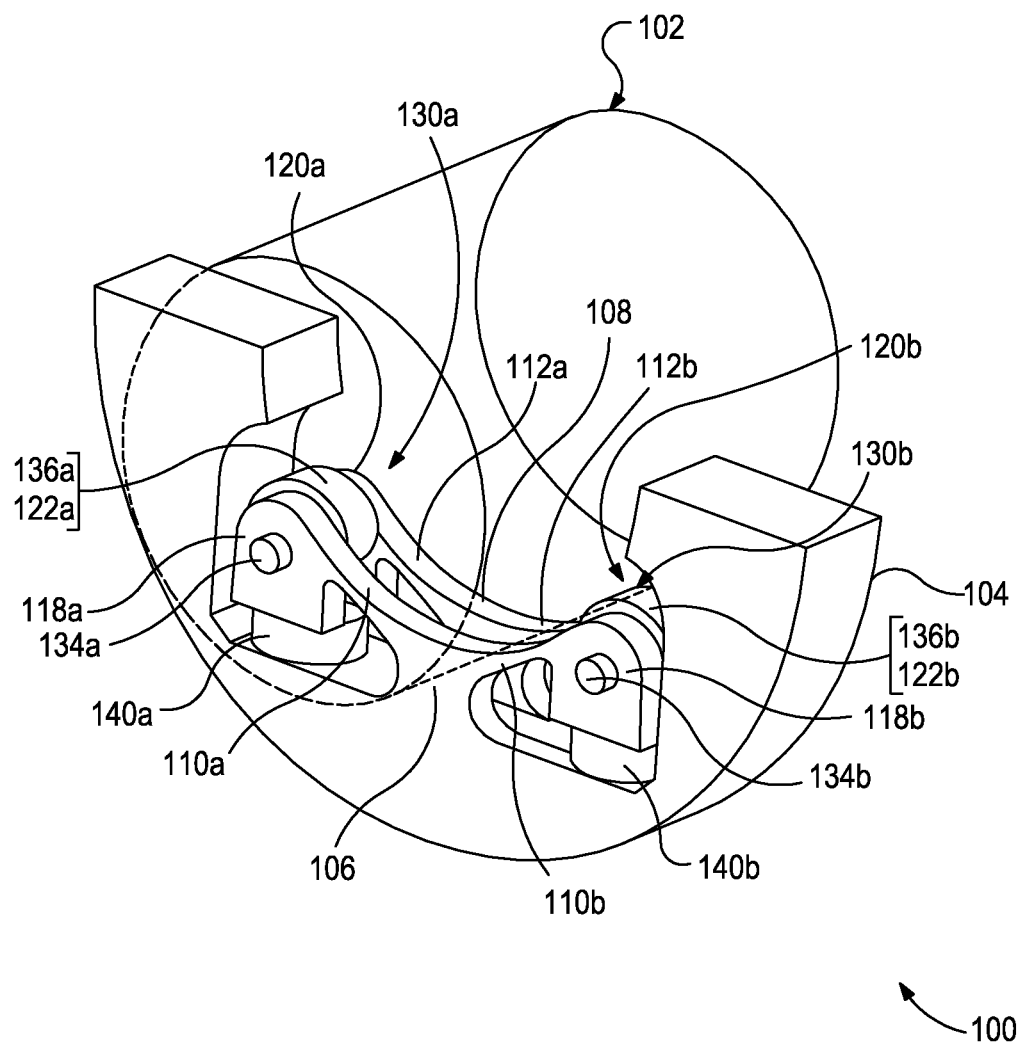
FIG. 1 illustrates an exemplary embodiment of an auxiliary bearing, according to one or more embodiments described.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary embodiment of an auxiliary bearing 100. The exemplary auxiliary bearing 100 may be a planetary-type auxiliary bearing. Under normal operating conditions, a magnetic bearing system (not shown), such as an active magnetic bearing system, supports a rotating shaft 102, and a radial gap or clearance exists between the rotating shaft 102 and the auxiliary bearing 100. However, if the active magnetic bearing system fails or is otherwise shut down, the rotating shaft 102 will drop and the auxiliary bearing 100 supports the rotating shaft 102. The auxiliary bearing 100 may be one of two or more auxiliary bearings that are positioned at axially-spaced locations along the shaft 102 including, but not limited to, opposing end portions of the shaft 102. The auxiliary bearing 100 may be disposed either inboard or outboard from the magnetic bearing system, depending on the application. The auxiliary bearing 100 may be used in a turbomachine, such as a turbine or a compressor.

The auxiliary bearing 100 may include an auxiliary bearing support structure 104 that extends at least partially around the circumference of the shaft 102. The support structure 104 may have one or more central pedestals 106, 108 (two are shown) coupled thereto or integrated therewith and extending radially-inward with respect to the support structure 104. In at least one embodiment, the pedestals 106, 108 may be disposed directly below the shaft 102 and may be axially-offset from one another. Cantilever beams 110a,b may extend from opposing sides of the first pedestal 106 in a plane perpendicular to an axis of the shaft 102. Likewise, cantilever beams 112a,b may extend from opposing sides of the second pedestal 108 in the plane perpendicular to the axis of the shaft 102. The first pedestal 106 and the beams 110a,b may be axially-symmetric with the second pedestal 108 and the beams 112a,b. Although FIG. 1 illustrates two opposing pedestals 106, 108, embodiments disclosed herein further contemplate a unitary pedestal structure (not shown) where the cantilever beams 110a,b, 112a,b extend separately from the unitary pedestal structure.

An end 118a,b of beams 110a,b, opposite the pedestal 106, may be suspended between the shaft 102 and the support structure 104. Likewise, an end 120a,b of beams 112a,b, opposite the pedestal 108, may be suspended between the shaft 102 and the support structure 104.

At least one roller 122a may be disposed at a first circumferential contact location 130a, with respect to the shaft 102, and operatively coupled to the beams 110a, 112a. Likewise, at least one roller 122b may be disposed at a second circumferential contact location 130b, with respect to the shaft 102, and operatively coupled to the beams 110b, 112b. Only two rollers 122a,b are shown in the auxiliary bearing 100 in FIG. 1, however, as may be appreciated, any number of rollers may be used. A first axle 134a may be coupled to the beams 110a, 112a and support the first roller 122a between the beams 110a, 112a, and a second axle 134b may be coupled to the beams 110b, 112b and support the second roller 122b between the beams 110b, 112b. In at least one embodiment, a cooling fluid may flow through the axles 134a,b to cool the rollers 122a,b, which may generate heat when in motion.

The beams 110a,b and 112a,b may be flexible and/or elastic and configured to bend or deflect radially-outward when loads are applied. This allows the beams 110a,b, 112a,b and the rollers 122a,b to divide the load of the shaft 102 relatively evenly. Moreover, the axially-arrayed beams 110a,b, 112a,b may ensure that the rollers 122a,b maintain their orthogonal orientation relative to the shaft 102 when the load of the shaft 102 is applied.

The rollers 122a,b may be rolling element bearings, each having an inner race (not shown) coupled to the respective axles 134a,b, wherein the axles 134a,b and the inner races are both stationary. The rollers 122a,b may also include a plurality of balls (not shown) disposed radially-outward from the inner race and adapted to spin or rotate within the rollers 122a,b. Each roller 122a,b may further include an outer race or outer surface 136a,b disposed radially-outward from the balls and adapted to engage and spin up with the shaft 102 when the shaft 102 drops onto the auxiliary bearing 100. In at least one embodiment, the outer surfaces 136a,b of the rollers 122a,b may be crowned to avoid edge loading and premature failure of the rollers 122a,b. In at least one embodiment, the outer surfaces 136a,b may include a hard coating or a solid lubricating coating, such as molybdenum disulfide or tungsten disulfide. In at least one embodiment, the rollers 122a,b may be deep groove ball bearings, angular contact ball bearings, or roller bearings, depending on the application. In another embodiment, the rollers 122a,b may be bushing-type sleeve bearings that may be solid-lubricated or oil film lubricated, i.e., with an oil ring.

One or more damping pads 140a,b may be disposed between the rollers 122a,b, respectively, and the support structure 104. The damping pads 140a,b may at least partially absorb the force from a drop of the shaft 102 and provide a degree of stiffness and/or damping to the auxiliary bearing 100. The damping pads 140a,b may include an elastomer such as polybutadiene, neoprene, Viton, a knitted metal mesh, such as those sold by Metex Corporation, or the like. The damping pads 140a,b may be sized using an impedance-matching algorithm. In at least one embodiment, the damping pads 140a,b may be similar to the damping pads disclosed in U.S. Pat. No. 5,521,448, the content of which is hereby incorporated by reference in its entirety to the extent that it is consistent with the present disclosure. It will be appreciated that the damping pads 140a,b may not be required in every application. Accordingly, they may be removed or otherwise omitted, and a small gap may be defined in their place to limit the radial deflection of the beams 110a,b and 112a,b. One or more preloaded bolt and spring arrangements (not shown) may be disposed proximate each damping pad 140a,b to maintain the damping pads 140a,b in a positive preloaded position.

The auxiliary bearing 100 may include a first section, e.g., lower half, and a second section, e.g., upper half, which may provide for ease of assembly and maintenance. For illustrative purposes, only the first section of the auxiliary bearing 100 is shown in FIG. 1. The second section may be a mirror image of the first section or differ from the first section, and therefore will not be described in detail. The circumferential contact location 130a,b of the rollers 122a,b may be tailored to specific design requirements. For example, the number of rollers in the second section may be reduced and the number of rollers 122a,b in the first half may be increased to account for an expected local load distribution due to the drop and impact of the shaft 102.

In at least one embodiment, the auxiliary bearing 100 may be rotated around the axis of the shaft 102 (not shown). For example, the auxiliary bearing 100 may be rotated about 90° around the axis of the shaft 102 such that the first section of the auxiliary bearing 100 is rotated to a left side of the shaft 102 and the second section of the auxiliary bearing 100 is rotated to a right side of the shaft 102. In this embodiment, the length of the beams 110a,b and 112a,b may be increased, thereby increasing the flexibility of the auxiliary bearing 100. In at least one embodiment, there may be three or more sets of pedestals 106, 108, beams 110a,b, 112a,b, and rollers 122a,b disposed circumferentially around the support structure 104 to support the shaft 102 after a drop in any radial direction.

In operation, when the magnetic bearing system cannot support the shaft 102, the shaft 102 drops onto the auxiliary bearing 100. The shaft 102, which may be rotating at a high rotation speed, engages the outer surfaces 136a,b of the rollers 122a,b, which are stationary or slow rolling during normal operating conditions, i.e., when the magnetic bearing system is supporting the shaft 102. When the shaft 102 engages the rollers 122a,b, the rollers 122a,b spin up and rotate with the shaft 102. The weight of the shaft 102 may cause the flexible beams 110a,b, 112a,b and the rollers 122a,b to deflect radially-outward to centralize the shaft 102 and ensure relatively equal load sharing between the rollers 122a,b. The damping pads 140a,b may limit the radial deflection of the beams 110a,b, 112a,b and the rollers 122a,b. In at least one embodiment, rotation of the rollers 122a,b may generate a significant amount of heat that may be generally dissipated or otherwise regulated with a cooling fluid, i.e., oil, etc., flowing within the rollers 122a,b.

Figure 2:
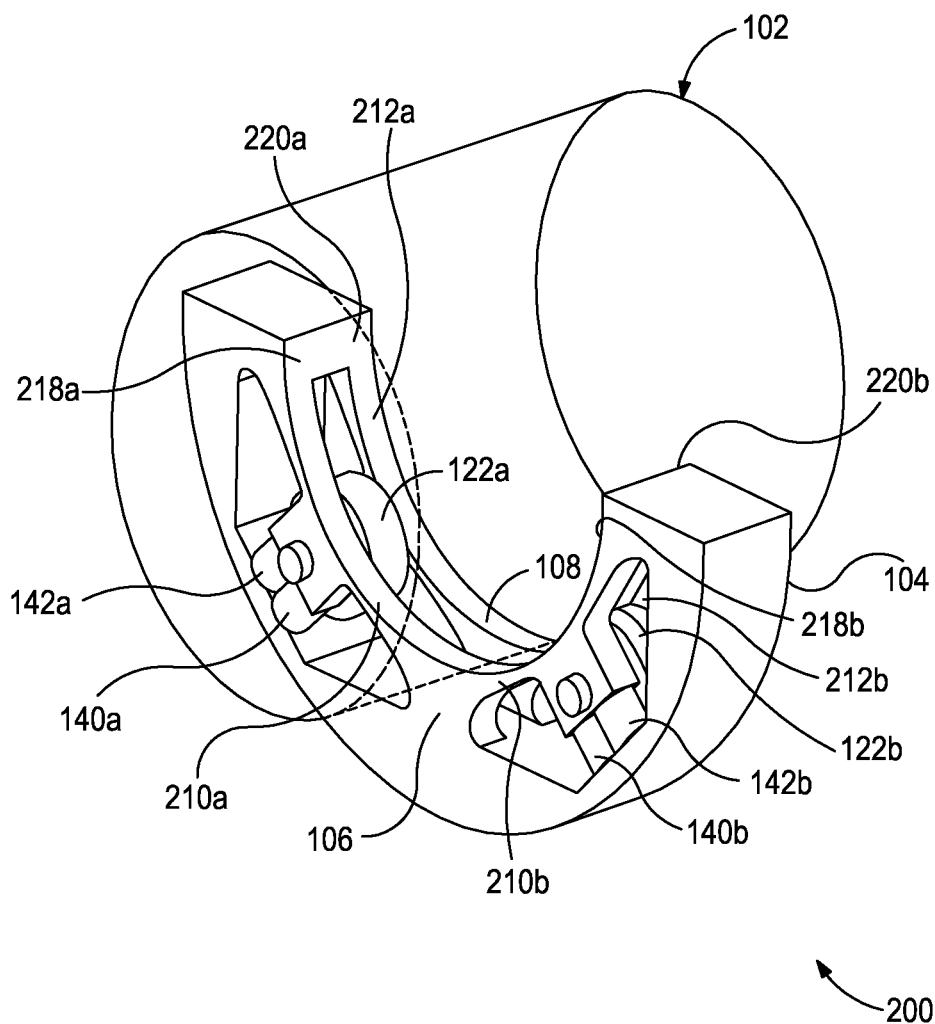
FIG. 2 illustrates another exemplary embodiment of an auxiliary bearing, according to one or more embodiments described.

FIG. 2 illustrates another exemplary embodiment of an auxiliary bearing 200, according to one or more embodiments described. The auxiliary bearing 200 illustrated in FIG. 2 is similar to the auxiliary bearing 100 depicted in FIG. 1, and like numerals are used to represent like elements. However, instead of having the beam ends 118a,b and 120a,b suspended between the shaft 102 and the support structure 104, as in FIG. 1, the beam ends 218a,b and 220a,b may be coupled to or integrated with the support structure 104, as shown in FIG. 2. Thus, the beams 210a,b and 212a,b are fixed-support beams, supported at both ends. As may be appreciated, the choice between the auxiliary bearing 100 having beams 110a,b, 112a,b with suspended ends 118a,b and 120a,b and the auxiliary bearing 200 having fixed support beams 210a,b, 212a,b may depend on the required stiffness, deflection, and/or stress of the particular application.

The first roller 122a may be disposed between the beams 210a, 212a at a point about halfway between the pedestals 106,108 and the ends 218a, 220a of beams 210a, 212a, respectively. Likewise, the second roller 122b may be disposed between beams 210b, 212b at a point about halfway between the pedestals 106,108 and the beam ends 218b, 220b. When the shaft 102 engages the rollers 122a,b, the beams 210a,b, 212a,b may be bend or deflect under the load of the shaft 102.

One or more damping pads 140a,142a (two are shown) may be disposed between the first roller 122a and the support structure 104, and one or more damping pads 140b,142b may be disposed between the second roller 122b and the support structure 104. For example, four damping pads may be disposed between each roller 122a,b and the support structure 104. However, as may be appreciated, the shape, size, number, and material of the damping pads 140a,b and 142a,b may vary depending on the application, without departing from the scope of the disclosure.

Figure 3:
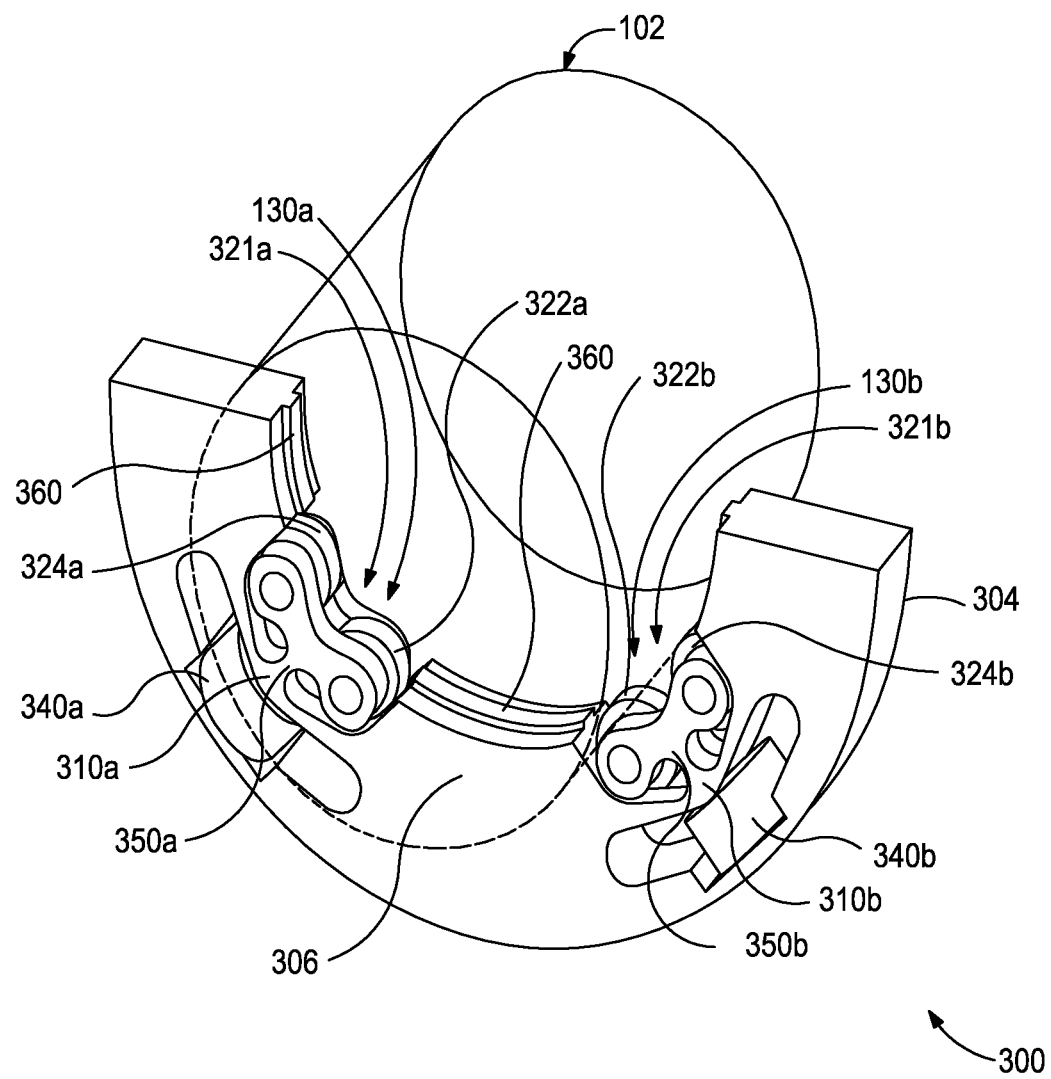
FIG. 3 illustrates another exemplary embodiment of an auxiliary bearing, according to one or more embodiments described.

FIG. 3 illustrates another exemplary embodiment of an auxiliary bearing 300, according to one or more embodiments described. The auxiliary bearing 300 illustrated in FIG. 3 is similar to the auxiliary bearings 100 and 200 depicted in FIGS. 1 and 2, respectively, and like numerals are used to represent like elements. However, instead of having a single roller 122a at the first circumferential contact location 130a and a single roller 122b at the second circumferential contact location 130b, the auxiliary bearing 300 may include a first double roller arrangement 321a at the first circumferential contact location 130a and a second double roller arrangement 321b at the second circumferential contact location 130b. The first double roller arrangement 321a may have two rollers 322a, 324a, and the second double roller arrangement 321b may have two rollers 322b, 324b. This allows rollers 322a, 324a to share the radial load at the first circumferential contact location 130a and rollers 322b, 324b to share the radial load at the second circumferential contact location 130b.

A first beam 310a may extend from a first side of a pedestal 306 and be coupled to or integrated with the support structure 304 distal the pedestal 306. Likewise, a second beam 310b may extend from a second side of the pedestal 306 and be coupled to or integrated with the support structure 304 distal the pedestal 306. In at least one embodiment, the first and second beams 310a,b may be replaced by two parallel beams (not shown), similar to the embodiments discussed with reference to FIG. 2. The beams 310a,b may be adapted to bend under the load of the shaft 102. As shown, the first circumferential contact location 130a is generally in the center of the first beam 310a, and the second circumferential contact location 130b is generally in the center of the second beam 310b.

The first double roller arrangement 321a may be operatively coupled to the first beam 310a through a first elastic pivot 350a which enables the first double roller arrangement 321a to flex slightly and facilitate load sharing between the rollers 322a, 324a. Likewise, the second double roller arrangement 321b may be operatively coupled to the second beam 310b through a second elastic pivot 350b which enables the second double roller arrangement 321b to flex slightly and facilitate load sharing between the rollers 322b, 324b. The elastic pivots 350a,b may also facilitate load sharing between the first and second double roller arrangements 321a,b. Damping pads 340a,b may be disposed behind the elastic pivots 350a,b, respectively, or the damping pads 340a,b may be omitted.

A static frame extension 360 may be integrated with and/or mounted on a radially-inner surface of the support structure 304. The static frame extension 360 may be in the plane of the support structure 304 and extend radially-inward therefrom. The static frame extension 360 may serve as a snubber to limit the overall movement of the rotor system and to limit the maximum impact loading on the auxiliary bearing system 300 for the case of momentary radial overloading. The surfaces of the static frame extension 360 may be made of a different material than the support structure 304, such as a copper alloy, or other abradable materials. The surfaces may be coated with a dry lubricant, or an appropriate tribolic surface can be added if desired. The static frame extensions 360 are particularly advantageous for larger systems, or when severe shaft 102 movement scenarios are expected.

Figure 4:
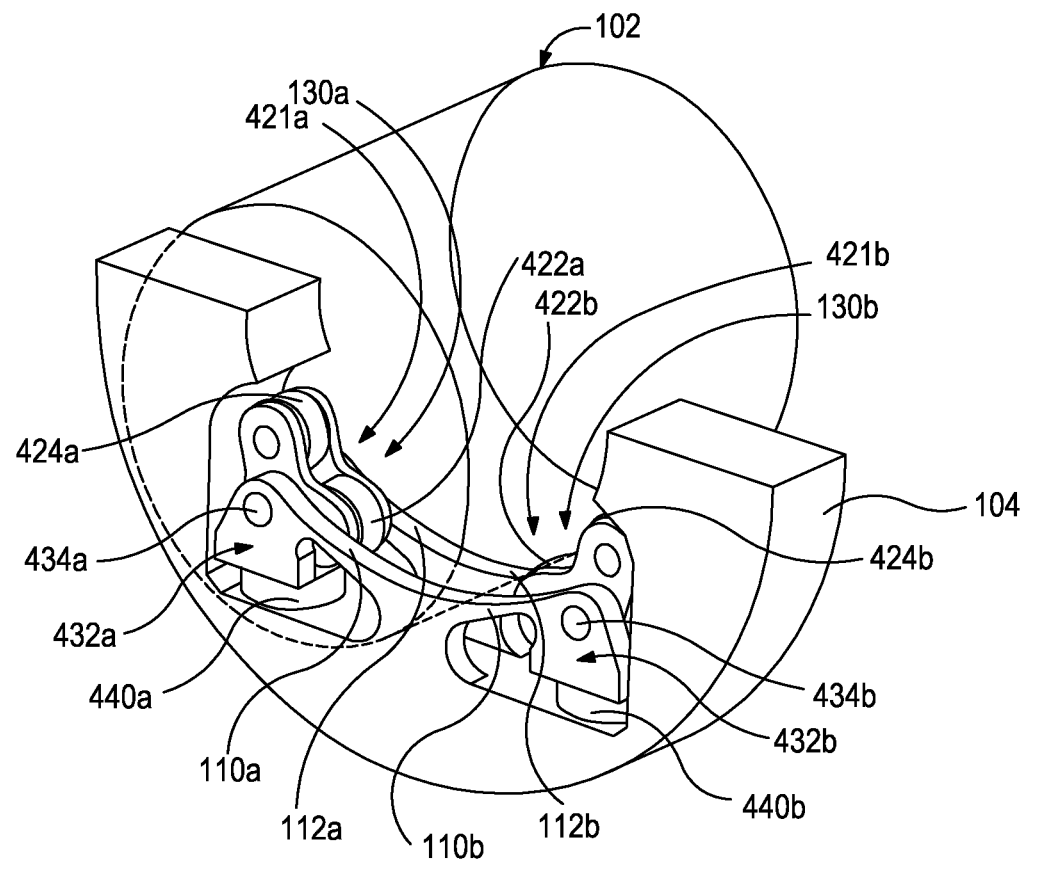
FIG. 4 illustrates another exemplary embodiment of an auxiliary bearing, according to one or more embodiments described.

FIG. 4 illustrates another exemplary embodiment of an auxiliary bearing 400, according to one or more embodiments described. The auxiliary bearing 400 illustrated in FIG. 4 is similar to the auxiliary bearing 100 depicted in FIG. 1, and like numerals are used to represent like elements. However, instead of having a single rollers 122a,b at the first and second circumferential contact locations 130a,b, respectively, the auxiliary bearing 400 may include a first movable frame 421a at the first circumferential contact location 130a and a second movable frame 421b at the second circumferential contact location 130b. The first movable frame 421a may include two rollers 422a, 424a, and the second movable frame 421b may also include two rollers 422b, 424b. The movable frames 421a,b may be supported by bushing-mounted axle systems 432a,b, respectively. The first bushing mounted axle system 432a may have an axle 434a coupled to beams 110a, 112a, similar to the arrangement in FIG. 1. Likewise, the second bushing mounted axle system 432b may have an axle 434b coupled to beams 110b, 112b. The flexible beams 110a,b, 112a,b and the movable frames 421a,b, which may pivot, may provide relatively equal load sharing between the first movable frame 421a and the second movable frame 421b. The arrangement may also provide relatively equal load sharing between the rollers 422a, 424a within the first movable frame 421a and between the rollers 422b, 424b within the second movable frame 421b. Damping pads 440a,b may be disposed between the movable frames 421a,b and the support structure 104 to limit the radial deflection of the beams 110a, b, 112a,b and the movable frames 421a,b.

Figure 5:
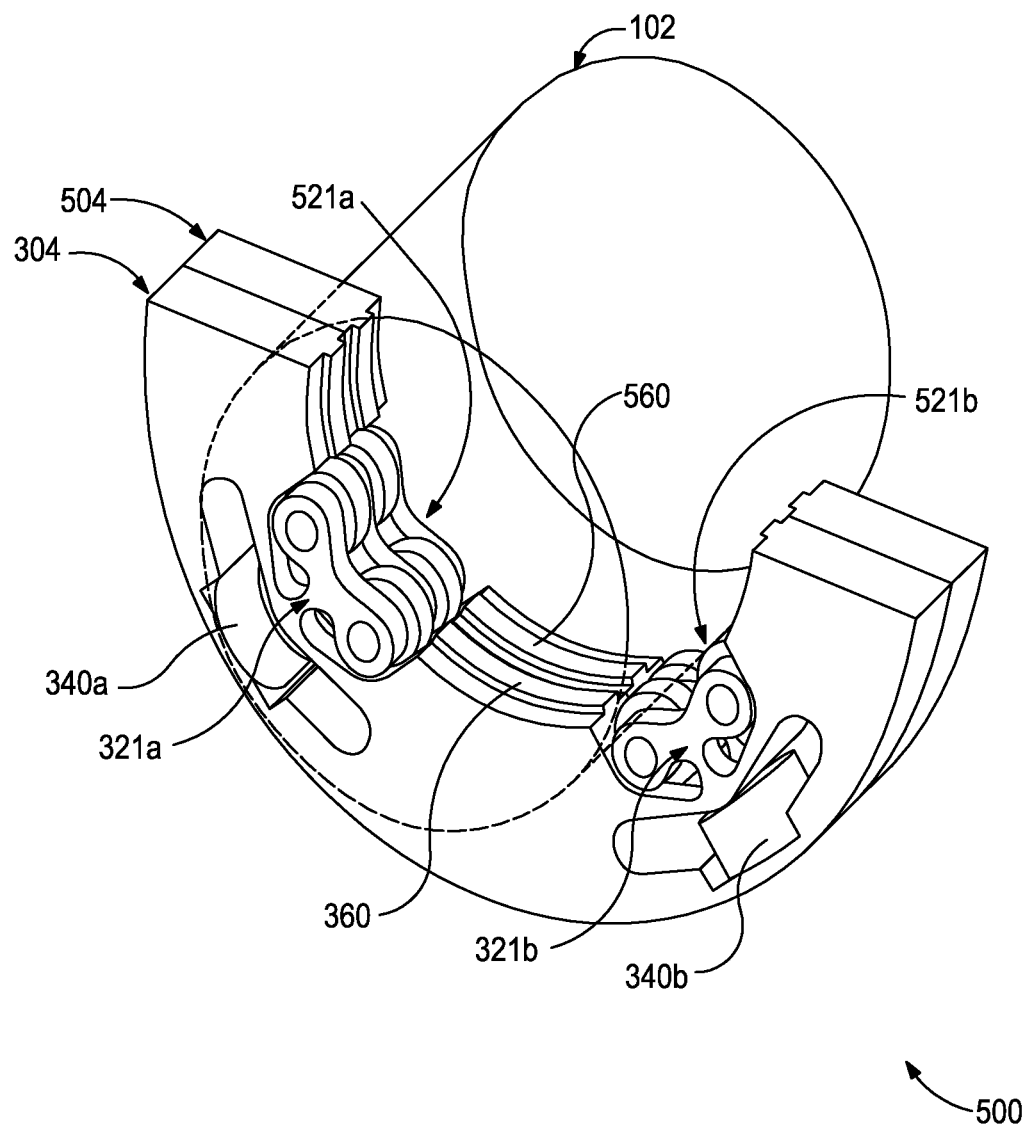
FIG. 5 illustrates another exemplary embodiment of an auxiliary bearing, according to one or more embodiments described.

FIG. 5 illustrates another exemplary embodiment of an auxiliary bearing 500, according to one or more embodiments described. FIG. 5 is similar to the auxiliary bearing 300 depicted in FIG. 3, and like numerals are used to represent like elements. The auxiliary bearing 500 may include first and second support structures 304,504 disposed axially-adjacent to one another. In at least one embodiment, each of the first and second support structures 304, 504 may be substantially similar to the support structure 104 depicted in FIG. 1, the support structure 104 depicted in FIG. 2, the support structure 304 depicted in FIG. 3, the support structure 104 depicted in FIG. 4, or the like. As shown, the second support structure 504 includes a third double roller arrangement 521a disposed axially-adjacent the first double roller arrangement 321a of the first support structure 304. The second support structure 504 also includes a fourth double roller arrangement 521b disposed axially-adjacent the second double roller arrangement 321b of the first support structure 304. By including a second support structure 504 having roller arrangements 521a,b that are axially-offset from the roller arrangements 321a,b of the first support structure 304, the load capacity of the auxiliary bearing 500 may generally be doubled.

The second bearing structure 504 may further include a second static frame extension 560 disposed axially-adjacent the first static frame extension 360. The second bearing structure 504 may also include additional damping pads (not shown) disposed axially-adjacent the damping pads 340a,b.

The auxiliary bearings 100,200,300,400,500 described herein may be more stable than conventional auxiliary bearings where the shaft 102 drops onto the inner races of ball or roller bearings. This is due to a combination of the two-point contact, low inertia rollers, and the low frictional forces from the smaller-sized bearings supporting the rollers. The embodiments described herein may be especially advantageous when used in scaled up applications supporting larger, heavier shafts 102, as the circumferential load locations 130a,b of the rollers outside the shaft 102 allows the individual bearings in each roller to be relatively small, even for larger applications.

Figure 6:
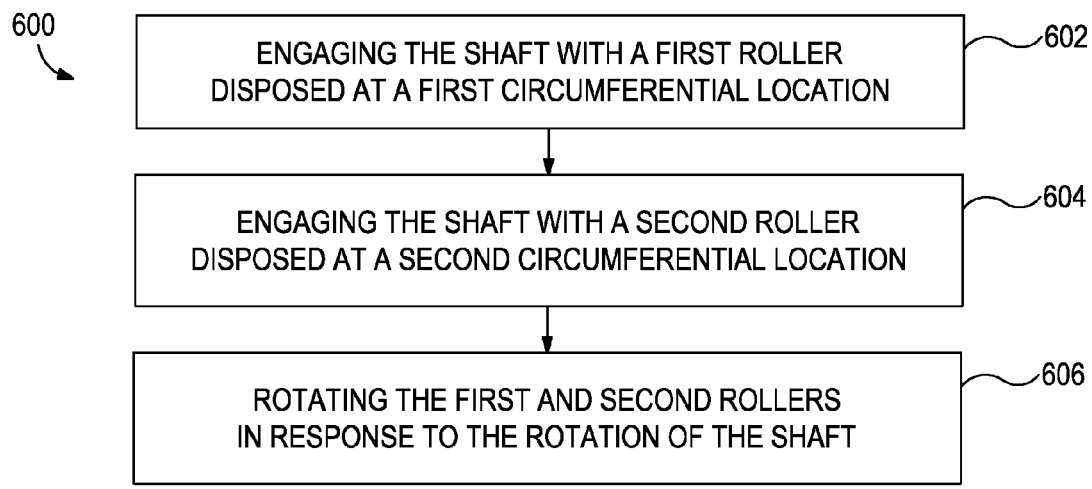
FIG. 6 illustrates an illustrative method for supporting a rotating shaft with an auxiliary bearing when a primary bearing system is unable to support the shaft, according to one or more embodiments described.

FIG. 6 illustrates an illustrative method 600 for supporting a rotating shaft with an auxiliary bearing when a primary bearing system is unable to support the shaft, according to one or more embodiments described. The method 600 may include engaging a shaft with a first roller disposed at a first circumferential location, as shown at 602. The first roller may be operatively coupled to and supported by a first beam. The first beam may extend from a first side of a pedestal in a direction perpendicular to the axis of the shaft. The method 600 may also include engaging the shaft with a second roller disposed at a second circumferential location, as shown at 604. The second roller may be operatively coupled to and supported by a second beam. The second beam may extend from a second side of the pedestal in a direction perpendicular to the shaft. The method 600 may further include rotating the first and second rollers in response to the rotation of the shaft, as shown at 606.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim

1. An auxiliary bearing, comprising:
   a support structure extending at least partially around a circumference of a shaft;
   a first pedestal extending radially-inward from the support structure;
   first and second flexible beams extending from opposite sides of the first pedestal in a plane perpendicular to an axis of the shaft;
   a first roller operatively coupled to the first beam; and
   a second roller operatively coupled to the second beam, wherein the first and second rollers are configured to engage the shaft.

2. The auxiliary bearing of claim 1, wherein ends of the first and second flexible beams are spaced away from the first pedestal and are suspended between the shaft and the support structure.

3. The auxiliary bearing of claim 2, wherein the first roller is disposed proximate the end of the first flexible beam and the second roller is disposed proximate the end of the second flexible beam.

4. The auxiliary bearing of claim 2, further comprising:
a first movable frame operatively coupled to the end of the first flexible beam, wherein the first roller comprises two rollers, each disposed within the first movable frame; and
a second movable frame operatively coupled to the end of the second flexible beam, wherein the second roller comprises two rollers, each disposed within the second movable frame.

5. The auxiliary bearing of claim 1, wherein ends of the first and second flexible beams, opposite the first pedestal, are coupled to or integrated with the support structure.

6. The auxiliary bearing of claim 5, wherein the first roller is disposed centrally between the first pedestal and the end of the first flexible beam and the second roller is disposed centrally between the first pedestal and the end of the second flexible beam.

7. The auxiliary bearing of claim 5, further comprising:
a first double roller arrangement operatively coupled to the first flexible beam, wherein the first roller comprises two rollers, each disposed within the first double roller arrangement; and
a second double roller arrangement operatively coupled to the second flexible beam, wherein the second roller comprises two rollers, each disposed within the second double roller arrangement.

8. The auxiliary bearing of claim 7, further comprising:
a first elastic pivot disposed between the first double roller arrangement and the first flexible beam; and
a second elastic pivot disposed between the second double roller arrangement and the second flexible beam.

9. The auxiliary bearing of claim 1, further comprising:
a first damping pad disposed between the first roller and the support structure; and
a second damping pad disposed between the second roller and the support structure.

10. The auxiliary bearing of claim 1, further comprising a static frame extension extending radially-inward from the support structure.

11. The auxiliary bearing of claim 1, further comprising:
a third roller disposed axially-adjacent the first roller; and
a fourth roller disposed axially-adjacent the second roller.

12. An auxiliary bearing, comprising:
a support structure extending at least partially around a circumference of a shaft;
first and second pedestals extending radially-inward from the support structure, wherein the second pedestal is axially-offset from the first pedestal with respect to the shaft;
first and second flexible beams extending from opposite sides of the first pedestal in a plane perpendicular to an axis of the shaft;
third and fourth flexible beams extending from opposite sides of the second pedestal in a plane perpendicular to the axis of the shaft, wherein the third beam is axially-symmetric with the first beam and the fourth beam is axially-symmetric with the second beam;
a first roller disposed between the first and third beams and adapted to engage the shaft; and
a second roller disposed between the second and fourth beams and adapted to engage the shaft.

13. The auxiliary bearing of claim 12, wherein:
ends of the first and second beams are spaced away from the first pedestal and are suspended between the shaft and the support structure, and
ends of the third and fourth beams are spaced away from the second pedestal and are suspended between the shaft and the support structure.

14. The auxiliary bearing of claim 13, further comprising:
a first axle coupled to the first and third beams proximate the ends of the first and third beams, the first axle adapted to support the first roller between the first and third beams; and
a second axle coupled to the second and fourth beams proximate the ends of the second and fourth beams, the second axle adapted to support the second roller between the second and fourth beams.

15. The auxiliary bearing of claim 13, further comprising:
a first movable frame coupled to and disposed between the first and third beams proximate the ends of the first and third beams, wherein the first roller comprises two rollers, each disposed within the first movable frame; and
a second movable frame coupled to and disposed between the second and fourth beams proximate the ends of the second and fourth beams, wherein the second roller comprises two rollers, each disposed within the second movable frame.

16. The auxiliary bearing of claim 12, wherein:
ends of the first and second beams are spaced away from the first pedestal and are coupled to or integrated with the support structure; and
ends of the third and fourth beams are spaced away from the second pedestal and are coupled to or integrated with the support structure.

17. The auxiliary bearings of claim 16, wherein:
the first roller is disposed between the first and third beams at a first circumferential location; and
the second roller is disposed between the second and fourth beams at a second circumferential location.

18. A method for supporting a rotating shaft with an auxiliary bearing when a primary bearing system is unable to support the shaft, comprising:
engaging the shaft with a first roller disposed at a first circumferential location, the first roller operatively coupled to and supported by a first flexible beam that extends from a first side of a pedestal in a plane perpendicular to an axis of the shaft;
engaging the shaft with a second roller disposed at a second circumferential location, the second roller operatively coupled to and supported by a second flexible beam that extends from a second side of the pedestal in the plane perpendicular to the axis of the shaft; and
rotating the first and second rollers in response to the rotation of the shaft.

19. The method of claim 18, further comprising bending the first and second flexible beams in response to a weight of the shaft.

20. The method of claim 19, further comprising damping the bending of the first and second beams with first and second damping pads, respectively.

* * * * *